(12) United States Patent
Vilander et al.

(10) Patent No.: US 6,775,542 B1
(45) Date of Patent: Aug. 10, 2004

(54) RECOVERY IN MOBILE COMMUNICATION SYSTEMS

(75) Inventors: Harri Vilander, Espoo (FI); Vesa Lehtovirta, Espoo (FI); Jari Huoppila, Espoo (FI)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/548,598

(22) Filed: Apr. 13, 2000

(30) Foreign Application Priority Data

Apr. 14, 1999 (FI) .............................................. 990826

(51) Int. Cl.$^7$ ................................................. H04Q 7/20
(52) U.S. Cl. .................. 455/423; 455/424; 455/67.11; 455/414.1; 370/218; 370/221; 370/225; 370/242; 370/310.1; 370/310.2
(58) Field of Search ............................ 455/67.11, 422, 455/423, 414, 424, 67.1, 422.1; 714/2, 3, 6, 15, 154, 155; 370/218, 219, 220, 221, 225, 228, 229, 338, 310.1, 310.2, 401, 242–245

(56) References Cited

U.S. PATENT DOCUMENTS

| | | | | |
|---|---|---|---|---|
| 4,442,502 A | * | 4/1984 | Friend et al. ................ 710/316 |
| 4,628,508 A | * | 12/1986 | Sager et al. .................... 700/82 |
| 4,823,256 A | * | 4/1989 | Bishop et al. ................. 700/82 |
| 5,214,652 A | * | 5/1993 | Sutton .......................... 714/10 |
| 5,530,908 A | * | 6/1996 | Rozenstrauch et al. ......... 455/8 |
| 5,758,053 A | * | 5/1998 | Takeuchi et al. ............... 714/4 |
| 5,815,651 A | | 9/1998 | Litt |
| 5,845,061 A | * | 12/1998 | Miyamoto et al. .......... 709/203 |
| 5,991,639 A | * | 11/1999 | Rautiola et al. .......... 455/414.1 |
| 6,072,776 A | * | 6/2000 | Takamichi ............... 370/241.1 |
| 6,081,535 A | * | 6/2000 | Nam et al. ................... 370/466 |
| 6,321,081 B1 | * | 11/2001 | Lee ............................. 340/7.32 |
| 6,374,112 B1 | * | 4/2002 | Widegren et al. ........... 455/452 |
| 6,385,451 B1 | * | 5/2002 | Kalliokulju et al. ........ 370/331 |
| 6,434,133 B1 | * | 8/2002 | Hamalainen ................. 370/338 |
| 6,438,370 B1 | * | 8/2002 | Einola et al. ................ 455/422 |
| 6,442,401 B1 | * | 8/2002 | Behan ......................... 370/252 |
| 6,445,917 B1 | * | 9/2002 | Bark et al. ................... 370/331 |
| 6,574,477 B1 | * | 6/2003 | Rathunde .................... 455/453 |

FOREIGN PATENT DOCUMENTS

| | | |
|---|---|---|
| EP | 0 221 274 A2 | 5/1987 |
| WO | 97/22054 | 6/1997 |

* cited by examiner

*Primary Examiner*—Marceau Milord
(74) *Attorney, Agent, or Firm*—Nixon & Vanderhye P.C.

(57) ABSTRACT

The present invention relates to a method of recovering from a processor fault in a mobile communication network node provided with a plurality of processors. In use, connections are established between the network node and mobile stations for packet data communication between the network node and the mobile station. The connections are classified into priority order on basis of predefined classifying parameters. Working condition of at least one of the processors of the network node is monitored, and in case of detecting a processor fault, user plane connections are relocated within the network node from the faulted processor to another processor in accordance with the classified priority order of the connections. The invention relates further to a network node.

20 Claims, 3 Drawing Sheets

RECOVERY IN MOBILE COMMUNICATION SYSTEMS

FIELD OF THE INVENTION

The present invention relates to a method of recovery procedures in a mobile communication systems, and more precisely, within a network node of a mobile communication system. The invention relates further to a network node arrangement for performing recovery operations in a communication system providing mobility for the users thereof.

BACKGROUND OF THE INVENTION

Various mobile communication network systems, such as for example the digital C-SM, D-AMPS or PDC systems or analogue NMT or AMPS systems, are well known to the skilled person. In general it can be said that they have been developed to provide an increased freedom and mobility for the users of mobile stations capable of communicating over a radio interface towards the network system. These systems are often referred to as Public Land Mobile Networks (PLMN).

It is also possible to use various data networks services, such as to access the TCP/IP Internet and to use services provided through the Internet, by means of a mobile station (MS) provided with data processing capability. Mobile data transmission is supported by both the digital mobile telephone systems, such as the GSM (Global System for Mobile communications) and the analog mobile systems.

The development in the area of mobile communications is leading towards even more powerful and flexible solutions which allow the users thereof to sent and receive, in addition to speech and text messages, various kind of data transmissions, such as high resolution images or ever video images. These improved solutions include General Packet Radio Service (GPRS), which can be referred to as $2^{nd}$ generation mobile telecommunication system and has its bases in the GSM system, and a Universal Mobile Telecommunications System (UMTS), which can be referred to as $3^{rd}$ generation mobile telecommunication system. Both GPRS and ZiTS are fairly new services defined e.g. by ETST (European Telecommunication Standard institute). IMT2000 is a further example of the improved radio service solutions.

The operational environment of a developed mobile communication system, such as the GPRS or the UMTS, can be defined as consisting of one (or several radio networks) interconnected by a core network. The core network provides an access to a data network, such as the Internet, for the users of the mobile stations communicating with the PLMN. The mobile network comprises a plurality of packet data service nodes (SN). Each SN (cr Servicing GPRS Support Nodes; SGSN) is connected to the radio network in such way that it is capable of providing the mobile stations provided with data processing facilities with the packet data service via base stations of the radio network. The intermediate radio network provides then packet switched data transmission between the current SN and the MS. The different mobile networks or PLMNs are connected so an external data network (e.g. the global connectionless TCP/IP Internet or a Packet Switched Public Data Network; PSPDN) via suitable linking apparatus, such as a GPRS Gateway Support Node (GGSN) or several GGSNs. Thus it is possible to provide packet data transmission between MSs and external data networks by Means of the GPRS or corresponding packet Radio Service, wherein the mobile network operates as an access network for the mobile user.

In the GPRS or in the proposed UMTS, the MS may have different operating states: an idle state, a standby state and an active estate. If is possible for the MS to remain continuously in the standby state, i.e. "always on". In other words, it is possible to switch the power on, register the MS in a GPRS or UMTS network and remain connected even several weeks without sending any data over the radio access bearer connection between the MS and the network apparatus. This registration can be active for weeks, but resources on the air interface (physical devices such as base stations, logical radio access bearers etc.) may tear down after a certain period of inactivity.

The radio connections between plurality of MS and the mobile radio networks are controlled by a Radio Network Controller (RNC) or a Base Station Controller (BSC) or a similar node arranged to control the connections. From point of view of the RNC the number of standby users (i.e. users who have not transferred any data during the last few minutes/hours) may be much higher than the number of active users is (i.e. the users currently transferring data).

A RNC node comprises several user plane processors handling user plane traffic and the related tasks (e.g. so called layer 2 processing, re-transmission over the air interface, ciphering etc.). Each of the user plane processors is dedicated to handle a small amount of the entire user plane traffic. The allocation of the user plane traffic connections to different processors can be made by a resource handler. One possibility of dividing the user plane traffic between the different processors is to measure the load in every processor and to select a processor with the smallest load for a new connection.

In addition to the user plane processors, the RNC node comprises routing processors. The routing processors transfer user data between Exchange Terminal (ET) cards and an appropriate user plane processor. The ET cards are used for correcting the nodes to the transfer network. One network node may contain more than one ET card.

In addition to routing tasks, the routing processor may also handle tasks like protocol termination. One routing processor may serve several user plane processors simultaneously. There may be more than one connection between the routing processor and the user plane processor. The RNC node may be provided with one or several routing processors. Each of the routing processors may have an IP address (Internet Protocol address) of its own, or then several routing processors may share the address.

SUMMARY OF THE INVENTION

In case a failure occurs in one of the routing processors, all connections implemented in the user plane should be immediately transferred to one or several of the remaining (and still operating) routing processors. Since one routing processor may have thousands of connections, the transfer thereof to another routing processor takes a substantially long time, and a problem relies in the arrangement of the control of the transfer proceedings in an appropriate manner.

The time required for the transfer is an essential disadvantage since it affects directly to the service level or quality experienced by the users. If a processor fault occurs in a routing processor and nothing is done, all users having at least one of their user plane connections through this faulted processor will discover the fault since no data can get through the node due to this faulted processor. Therefore the users must first disconnect the current ongoing data transfer session and then immediately establish a new session. To be able to do this it is assumed that the system has noticed the faulted processor and can allocate a new one, otherwise it might try using the same faulted processor even for the new session and it would be impossible to initiate a new session.

In addition, those subscribers being in the standby state may not become aware of the faulted processor, but believe that that everything is in order. In case where somebody else tries to reach the subscriber terminal connected to the faulted processor, the connection cannot be established.

Therefore there is a need to solve the problem relating to relocation of the user plane connections from a faulted processor to another processor such that a reasonable overall system load can be maintained. The overall performance of the system should not be deteriorated and the user plane traffic on another processors should not be hindered due to the faulted processor.

Prom the point of view of the end user, the processor fault should be as invisible as possible. All symptoms caused by a processor fault should be such that they could be compared to the general symptoms caused by problems in the Internet performance (slow transfer of data, lost datagrams etc.) so the upper layers (TCP (Transmission Control Protocol) layer and application layers) could take care of this.

One of the most problematic situations is an instance where each and every user will notice the system fault, and that this will occur more or less simultaneously. This will happen if the users must close their session and restart the connection regardless the fact whether they were in an active state or not. This can lead to an overload in the RNC node, and more precisely, to an overload situation in the control plane (i.e. in the resource handler or similar facility) of the node, which may happen if there are thousands of connections and if they have to be relocated immediately after a processor fault regardless of the status of the connections (active or standby). The same will occur if the node or system automatically initiates a relocation process for all user plane connections from the faulted processor. In addition, signalling network between various nodes may also become overloaded due to a fault in one processor in one of the nodes of the network system. In more general terms, it is important to be able to avoid any situations which could result to a restart of the entire network node.

Therefore it is an object of the present invention to overcome the disadvantages of the prior art solutions and to provide a new type of solution for recovery procedures in a network node. A further object is to limit the recovery procedures to occur only within the network node including the faulted processor.

According to a first aspect, the invention provides a method of recovering from a Processor fault in a mobile communication network node provided with a Plurality of processors, wherein corrections are established between the network node and mobile stations for packet data communication between the network node and the mobile station, comprising classifying the connections into priority order or, basis of predefined classifying parameters; monitoring the working condition of at least one of the processors of the network node; and in case of detecting a processor fault, relocating user plane connections within the network node from the faulted processor to another processor in accordance with the classified priority order of the connections.

According to a further aspect, the invention provides a network node in a communication system serving a plurality of mobile stations via a radio interface, wherein connections are established between the mobile stations and the network node, comprising: control means arranged to classify the connections into a priority order; a plurality of processors; means for monitoring the working condition of at least one of the processors; wherein the arrangement is such that in case of detecting a processor fault in the node, user plane connections within the node are relocated from the faulted processor to another processor of the node in accordance with said priority order.

According to additional embodiments the invention provides a method, wherein the classifying parameters are based on Quality of Service (QoS) parameters. According to one aspect, real-time connections are relocated first and connections which do not have any strict real-time requirements are having lower priority. In one alternative connections with no strict real-time requirements are defined as higher priority connections and are relocated first and real-time connections are disconnected after the detection of processor fault. The method may in accordance further comprise monitoring the status of the connections between the mobile stations and the network node, wherein the classifying parameters can be based on connection activity status.

Several advantages are obtained by means of the present invention, since the solution provides a faster recovery from processor faults in mobile communication system Codes, such as in UMTS RNCs, or SGSNs or GGSNs, than the prior art solutions. The solution provides a transparent or as little deteriorating transfer of connections from a faulted processor to another processor as possible, and thus the active users will notice only a minor drop (if at all) in the service quality. The standby user may not notice anything, but will use new processor when becoming active again. In addition, there is no reed to re-establish the connection, but it will continue through another routing processor. The solution provides a possibility to limit the consequences of a processor fault to be visible only within one node, while the connections between several nodes are not affected (e.g. between a RNC and a SGSN).

In the following the present invention and the other objects and advantages thereof will be described in an exemplifying manner with reference to the annexed drawings, in which similar reference characters throughout the various figures refer to similar features.

DETAILED DESCRIPTION OF THE DRAWINGS

Figure 1:
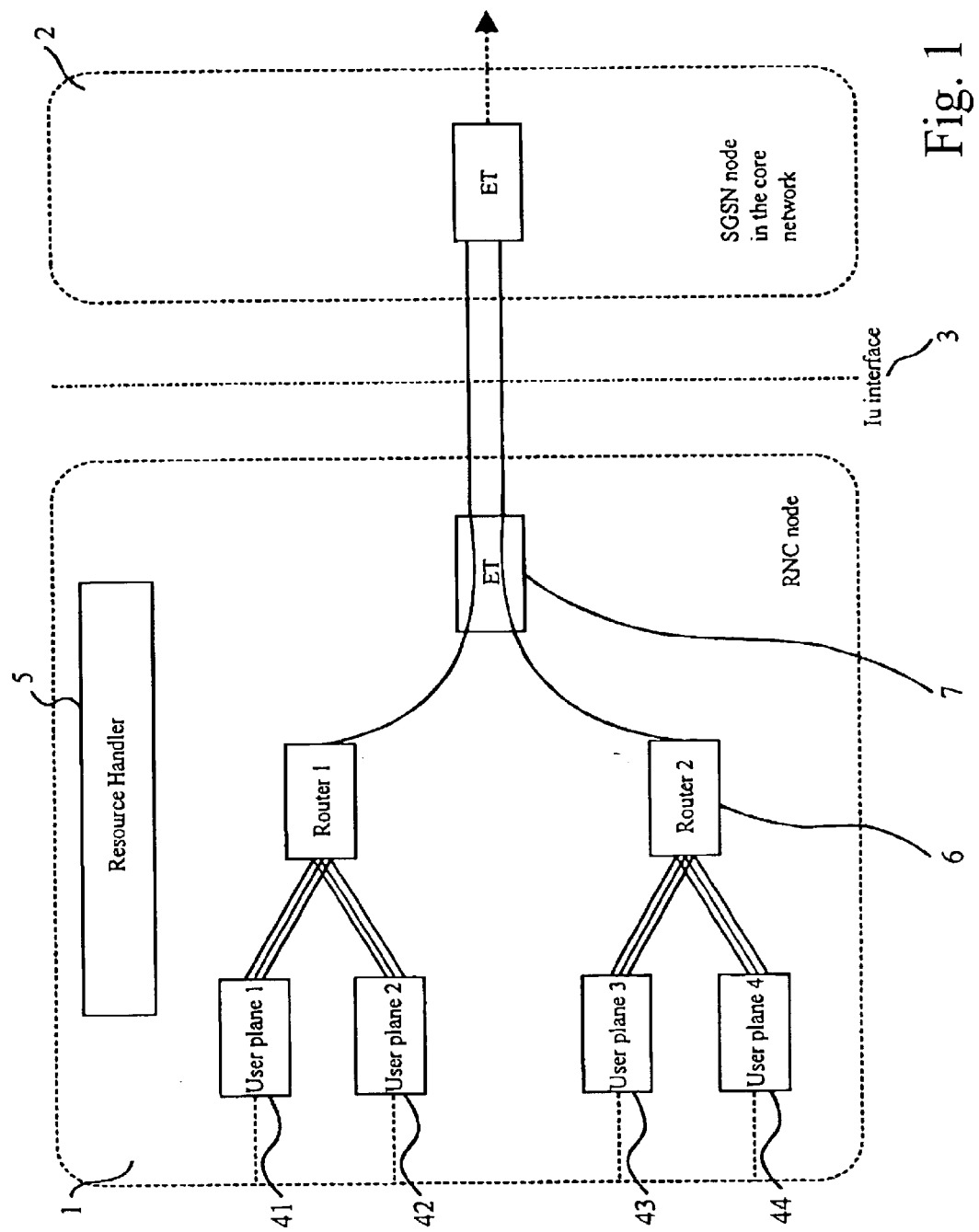
FIG. 1 is a schematic presentation of configuration of a RNC node in normal conditions of operation.

FIG. 1 is a schematical presentation of one possibility for the configuration of a Radio Network Controller (RNC) node of a UMTS. It is noted here that in the mobile network arrangements a node similar from the function of the RNC may be named differently, such as a Base Station Controller (BSC) of a GPRS. In addition, it is also noted that the invention is not restricted to RNC type nodes only, but all other mobile communication network nodes, both in the radio network side and in the core network side, are intended to be covered by the term network node.

The RNC i.e. the radio network node 1 can be seen in FIG. 1 on the left hand side from Iu interface 3, whereas the a core network node 2, e.g. the SGSN node, is disclosed in the right hand side from the Iu interface 3. The network nodes can be implemented by means of per se known ATM (Asynchronous Transfer Mode) technology or by utilising any other appropriate technology.

The RNC node comprises several user plane processors 41, 42, 43, 44 (4 disclosed in FIG. 1) arranged to handle user plane traffic and the related tasks (e.g. so called layer 2 processing, re-transmission over the air interface, ciphering etc.). Each of the user plane processors 41 to 44 is dedicated to handle a small amount of the entire user plane traffic. The allocation of the user plane traffic connections to different processors is made by a resource handler 5 controlling the operation of the processors.

In addition to the user plane processors, the RNC node 1 comprises a plurality of routing processors 6 (FIG. 1 discloses two routing processors: router$_1$, router$_2$). The routing processors 6 transfer user data between an Exchange Terminal (ET) card 7 of the network node 1 and an appropriate user plane processor of the plurality of processors 41 to 44. The arrangement can be such that one or several connections is provided between the ET-card and the routing processor, e.g. by means of an ATM switch.

One routing processor may serve several user plane processors simultaneously. There may be several connections between the routing processor and each of the user plane processors, the connection being implemented e.g. by means of an ATI switch. Each of the routing processors may have an IP address (Internet Protocol address) of its own, but the arrangement car also be such that they have a common IP address.

There can be a significant number of user plane connections on one single user plane processor, but only a portion or them may be in active state at the same time. This means that, for example, only couple of hundreds of the user plane connections or so are simultaneously transferring data.

Figure 3:
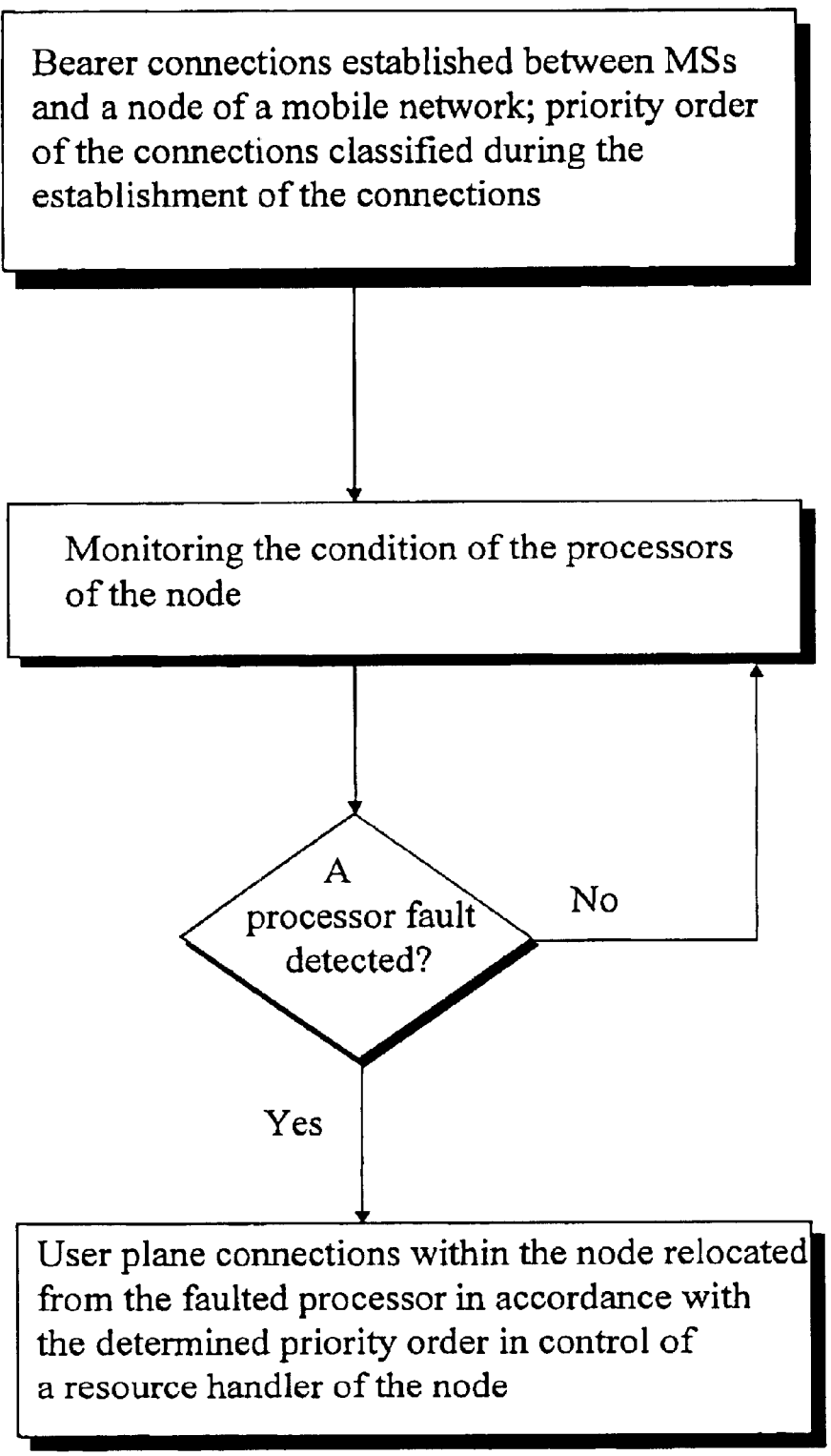
FIG. 3 is a flow chart illustrating the main operational principles of the proposed recovery procedure.

Referring now also to FIG. 3, it is advantageous to be able to separate higher priority connections, such as the actual active connections, from lower priority connections, such as the standby connections, in separate priority classes and to relocate the user plane connections in accordance with these classes. This can be done e.g. by checking the data transfer status on the air interface. Should a failure occur, it is, after the detection of the failure, possible to concentrate on relocating the higher priority connections first while leaving the lower priority connections for a later stage.

The failure detection can be implemented in various alternative ways. Polling by the resource handler and heartbeat transmission from the processors are given herein as examples of the possible ways of implementing the failure detection function.

In the polling solution the resource handler sends in predefined time intervals an inquiry to the processors of the node concerning the working condition thereof. As a response a properly working processor sends a response indicating that everything is in order. A faulted processor may in turn send a response indicating that something is wrong. This response may include some more detailed information concerning the nature of the fault, or just be a simple message stating that the processors has failed/something is wrong. In case no response is received by the resource handler 5 within a certain time interval, it will immediately recognise that the processor is not working properly.

In the heartbeat alternative the processors are adapted to send, with predefined time intervals, a message or signal to the resource handler indicating that the processor is working properly. In case the resource handler does not receive this message in a predefined manner and in a predefined intervals, or if the message deviates from the predefined form, it concludes that the processor has failed, and proceeds accordingly.

The connections can be divided in different priority categories. The actual relocation procedure of the user plane connections can then be started from the high priority connections. The priority order can be deduced from the Quality of Service properties of the radio network system. Also, if there is not enough capacity for all user plane connections on the other processors, some of the lower priority connections may even be dropped. In addition, it may be advantageous to drop first the low priority standby connections before dropping low priority active connections.

All such lower priority connections which are marked to be relocated at a later stage can be relocated immediately after the relocation process of the higher priority active connection is finished. When relocating the lower priority connections a care has to be taken so that the overall node load will not become too high due to this background-like task. The step of setting the connections between the user terminal and the node in a priority order could be for instance such that the priority order based on quality of service properties is such that real-time connections are relocated first, connections which are not having any strict real-time requirements are relocated next, and best effort connections as relocated only after the two firstly mentioned. In case there is a risk for remaining routing processors to be overloaded, the lowest priority connections are not relocated at all, but will become disconnected.

According to one approach those corrections which do not have any strict real-time requirements are defined as higher priority connections and are thus relocated first, while the realtime connections are disconnected after detecting a processor fault. By means of this it is possible to avoid unnecessary relocation of the user plane connections of the active status subscribers. This is due the fact that in some nodes the resource handler may firstly try to restart the processor before initiating the relocation procedure. As the initiation of the relocation may in this type of solution take 10 seconds or even more, the active users will in most instances close the connection believing that the connection is completely lost. The dropping of those connections having a high Meal-time requirement (such as a transmission of Internet calls, video images etc.) instead of trying to relocate them first will prevent initiation of unnecessary relocation process and thus an occurrence of a possible overload situation in the node.

Each radio access bearer has Quality of Service (Qos) properties which are defined during the set-up i.e. establishment of the radio access bearer connection in accordance with Radio Link Control (RLC) protocol. The resource handler 5 is provided with information regarding the QoS properties, preferably simultaneously during the establishment of the connection between a mobile station and the RNC node. The information can be mapped in a table or similar facility, such as a database or record or similar facility, in the resource handler. What is essential here is that the priority information is stored in such a way that it can be used for the prioritising process subsequent to a processor fault.

It is, of course possible to classify the connection even such that each of them has a priority class of its own, i.e. that all connections are in priority order relative to each other. However, it is considered as more preferred and simple solution to form priority classes, and thus to have connection groups such that each groups has a certain priority class relative to other groups.

The parameters used when forming the priority classes can also be based on the properties of the radio channel. The radio channel can be a dedicated radio channel or a common radio channel, or a shared radio channel or paging channel.

The property classes can also be based on properties which relate to Medium Access Control Layer (MAC) below the RLC layer.

According to one alternative the priority classes are based on separation of the active and passive connections, i.e. the active and passive connections are monitored and separated from each other for the relocation purposes. When monitoring the status of the radio access bearer (active or passive) between the mobile station and the networks node, one possibility is to check the situation in the user plane processor (i.e. on layer two and more precisely, on Radio Link Control Protocol layer) in the RNC node. Normally the Radio Link Control Protocol of the user plane processor is used for taking care of resending data over the air interface. The RNC node comprises also queues and retransmission buffers in the layer two so as to enable the data transmission proceedings. It is possible to utilise the status of the buffers in the monitoring of the status of the connections when rearranging and relocating the user plane connections within the node. A simple algorithm for this could be:

If unsent data exists in a sending queue OR data exists in a retransmission buffer THEN relocate the connection immediately to another processor ELSE mark this connection to be transferred later.

It is noted that there are also various other possibilities of providing a suitable algorithm than the above example, such as utilisation of any unacknowledged data in the buffer. In addition, different timers and/or counters can be utilised for the determination of the status of the connection.

Figure 2:
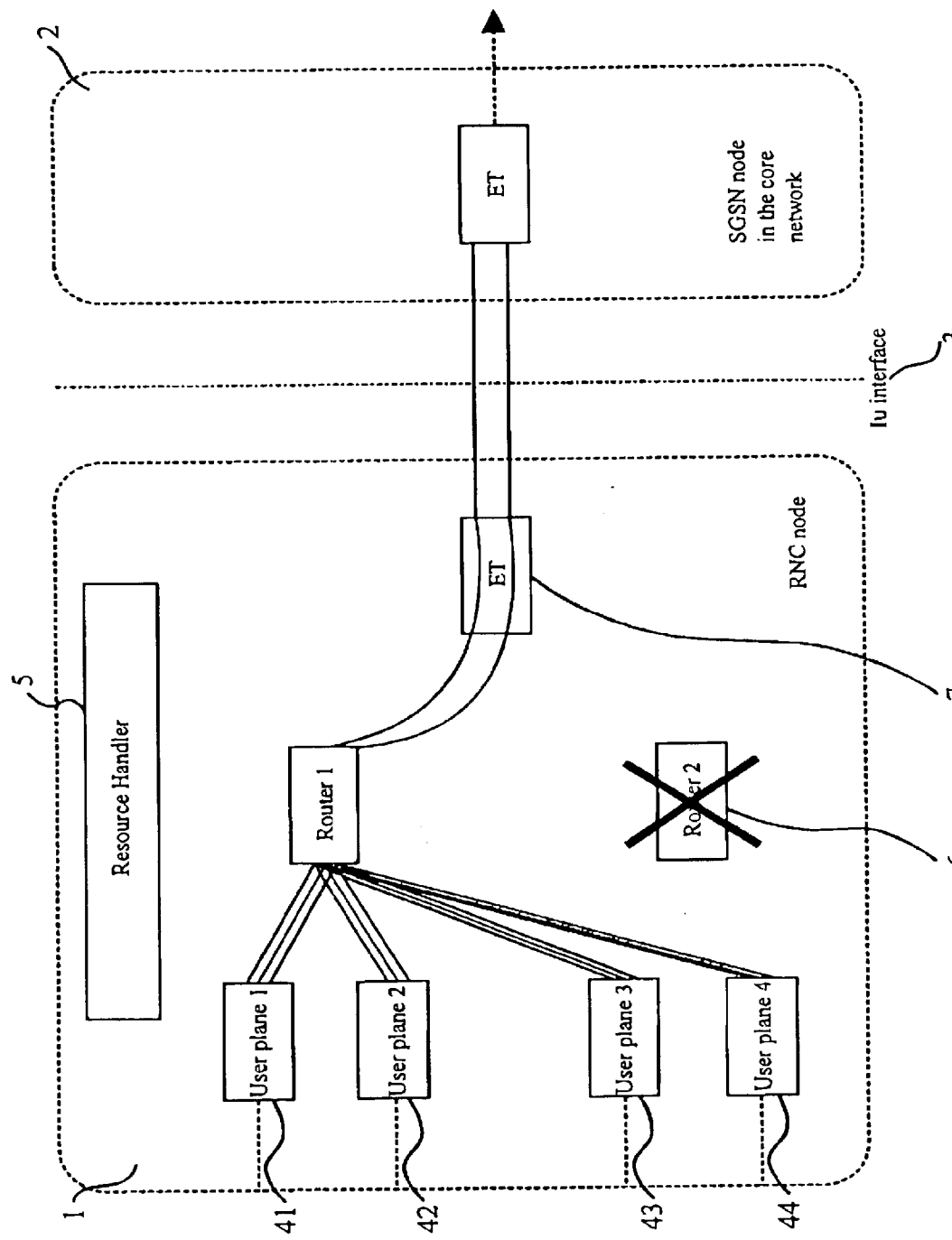
FIG. 2 is a schematic presentation of configuration after RNC node reconfiguring operations.

FIG. 2 discloses in more detail what will occur in case of a processor failure. In this example router$_2$ has failed, which failure has been detected e.g. by the monitoring operations described above. The resource handler 5 in the RNC node, which has detected the processor fault, is aware of the configuration within the node and the load situation of the other routing processors, and thus it can re-connect the user plane processors 43 and 44 to the ET card 7 in a predefined priority order so that the connections will now go through router$_1$ instead of router$_2$. In practise this means that virtual connections (VC) between the user plane processors 43 and 44 and the router$_2$ must be replaced in priority order with new virtual connections between the user plane processors 43 and 44 and the router$_1$. The virtual connection between router$_2$ and the ET card 7 must also be replaced with a new virtual connection between the router and the ET card 7. In addition, the IP address of the failed routing processor, i.e. router$_2$ must be handed over to the new routing processor, i.e. to router$_1$ so that the router$_1$ may start to handle such traffic which is initially destined i. e. addressed to the route$_2$.

According to one possibility the user plane connections are multiplexed into one or several virtual ATM connections between the user plane processor and the routing processor. In this instance the entire virtual ATM connection will become transferred at once to another processor from the faulted processor. The relocation order of the user plane connections can in this instance be based on priority order data concerning the transmission order of the connection data from the resource handler to he other, substituting processor, said connection data including required parameters of the multiplexed connections to be relocated. This priority order data may be based on similar features as described above, such as status of the connection, service class, QoS parameters etc. Thus, even though the virtual connection is transferred at once, the multiplexed connections thereof will become relocated in an order which is defined by the priority order data.

When the higher priority connections are relocated first, the higher priority user will receive better service than the lower priority users. Even though the end user may still notice some drop in the service level of the offered service during the relocation of user plane connection from the faulted processor to a new processor, the degradation of the service level due to a RNC processor fault and relocation of user plane connections is much less than in the prior art arrangements. As the packet switched data networks, such as the Internet, are connectionless service concepts, the fault instance can be compared to the normal variance of the overall performance of the packet switched data networks. The relocation procedure of the connections from the faulted processors to a substituting processor is handled internally within the node, and does thus not cause any signalling between different nodes of the network system.

It is even possible, that the non-active, standby users do not even notice any temporary degradation of service level, since their user plane connection is recovered during the standby period.

Thus, the invention provides an apparatus and a method by which a significant improvement can be achieved in the recovery proceedings in a telecommunication system. It should be noted that the foregoing examples of the embodiments of the invention are not intended to restrict the scope of the invention to the specific forms presented above but the present invention is meant rather to cover all modifications, similarities and alternatives which are included in the spirit and scope of the present invention, as defined by the appended claims.

What is claimed is:

1. A method of recovering from a processor fault in a mobile communication network node including a plurality of processors, wherein connections are established between the network node and mobile stations for packet data communication between the network node and the mobile station, comprising:

classifying the connections into priority order on the basis of predefined classifying parameters;

monitoring the working condition of the plurality of processors included in the network node; and in case of detecting a processor fault in one of the plurality of processors, relocating user plane connections within the network node from the faulted processor to another of the plurality of processors in accordance with the classified priority order of the connections.

2. The method in accordance with claim 1, wherein the classifying parameters are based on Quality of Service (QoS) parameters.

3. The method in accordance with claim 2, wherein the Quality of Service (QoS) parameters are based on the properties of Radio Access Bearer forming at least of a part of the connection between the node and the mobile station.

4. The method in accordance with claim 2, wherein the Quality of Service (QoS) parameters are based on the properties of the network service in the core network side.

5. The method in accordance with claim 1, wherein real-time connections are relocated first and connections which do not have any strict real-time requirements are having lower priority.

6. The method in accordance with any of the claim 1, wherein connections with no strict real-time requirements are defined as higher priority connections and are relocated first and real-time connections are disconnected after the detection of processor fault.

7. The network node in accordance with claim 6, wherein the classifying is based on Quality of Service (QoS) parameters.

8. The method in accordance with claim 1, further comprising monitoring the status of the connections between the mobile stations and the network node, wherein the classifying parameters are based on connection activity status.

9. The method in accordance with claim 8, wherein the classifying parameters are based on the properties of the radio channel, said radio channel being one of a dedicated radio channel, a shared radio channel, a paging radio channel, a common radio channel or properties related to a Medium Access Control (MAC) layer.

10. The method in accordance with claim 8, wherein the activity status is based on the properties of the Radio Link Control (RLC) protocol.

11. The method in accordance with claim 10, wherein the used properties of the Radio Link Control Protocol comprise at least one of buffer status or counter values or timer values of the Radio Link Control protocol or Quality of Service parameters.

12. The method in accordance with claim 8, wherein the monitoring of the status of connections comprises monitoring of at least one user plane processor of the network node for detecting active connections between the network node and the mobile stations, preferably by monitoring transmission queues or buffers of the node, wherein queues or buffers containing unsent data or unacknowledged data are defined as active connections.

13. The method in accordance with claim 1, wherein the user plane connections are multiplexed into at least one virtual ATM connection, and wherein the relocation of the user plane connections is based on priority order data available in a resource handler of the node, said priority order data informing the order in which the multiplexed connections are to be relocated.

14. The method in accordance with claim 1, wherein the network node is a radio network controller (RNC) node of a Universal Mobile Telecommunication System (UMTS).

15. The method in accordance with claim 1, wherein the network node is a base station controller (BSC) node of a General Packet Radio Service (GPRS).

16. The method in accordance with claim 1, wherein the network node is a Serving General Packet Radio Service Support Node (SGSN) or a Gateway General Packet Radio Service Support Node (GGSN) of the core network of the mobile communication system.

17. A network node in a communication system serving a plurality of mobile stations via a radio interface, wherein connections are established between the mobile stations and the network node, comprising:

a controller arranged to classify the connections into a priority order;

a plurality of processors;

a monitor for monitoring the working condition of at least one of the processors;

wherein the arrangement is such that in case of detecting a processor fault in the node, user plane connections within the node are relocated from the faulted processor to another processor of the node in accordance with said priority order.

18. The network node in accordance with claim 17, wherein the network node is a base station controller (BSC) node of a General Packet Radio Service (GPRS) or a radio network controller (RNC) of a Universal Mobile Telecommunication System (UMTS) or a Serving General Packet Radio Service Support Node (SGSN) or a Gateway General Packet Radio Service Support Node (GGSN) of the core network of the communication system, and said control means comprises a resource handler of the node.

19. A network node in accordance with claim 17, wherein the user plane connections are implemented between user plane processors and routing processors of the node.

20. A network node in accordance with claim 17, further comprising means for monitoring the status of the connections between the mobile stations and the network node.

* * * * *

UNITED STATES PATENT AND TRADEMARK OFFICE
CERTIFICATE OF CORRECTION

PATENT NO. : 6,775,542 B1
DATED : August 10, 2004
INVENTOR(S) : Harri Vilander et al.

It is certified that error appears in the above-identified patent and that said Letters Patent is hereby corrected as shown below:

Column 3,
Line 16, "Prom" should read -- From --.

Column 9,
Line 4, delete "claim 6" and insert -- claim 17 --.

Signed and Sealed this

Eighteenth Day of April, 2006

JON W. DUDAS
*Director of the United States Patent and Trademark Office*